United States Patent
Vembuli et al.

(10) Patent No.: US 10,574,524 B2
(45) Date of Patent: Feb. 25, 2020

(54) INCREASING REUSABILITY OF AND REDUCING STORAGE RESOURCES REQUIRED FOR VIRTUAL MACHINE IMAGES

(71) Applicant: VMWARE, INC., Palo Alto, CA (US)

(72) Inventors: Rahav Vembuli, Bangalore (IN); Doulat Desai, Bangalore (IN); Pramod Chickaballapura Vasudeva Murthy, Bangalore (IN); Bindumadhava Gururao, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 157 days.

(21) Appl. No.: 15/803,879

(22) Filed: Nov. 6, 2017

(65) Prior Publication Data

US 2019/0140905 A1    May 9, 2019

(30) Foreign Application Priority Data

Jul. 15, 2017   (IN) .............................. 201741025199

(51) Int. Cl.
*H04L 12/24* (2006.01)
*G06F 9/50* (2006.01)
*G06F 9/455* (2018.01)

(52) U.S. Cl.
CPC .......... *H04L 41/0846* (2013.01); *G06F 9/505* (2013.01); *G06F 9/5077* (2013.01); *H04L 41/0853* (2013.01); *H04L 41/0889* (2013.01); *G06F 9/45558* (2013.01); *G06F 2009/45562* (2013.01)

(58) Field of Classification Search
None
See application file for complete search history.

(56) References Cited

U.S. PATENT DOCUMENTS 9,785,478 B1 * 10/2017 Babu B R ............. G06F 9/5077

\* cited by examiner

*Primary Examiner* — Jeffrey R Swearingen
(74) *Attorney, Agent, or Firm* — Patterson + Sheridan, LLP (57) ABSTRACT

Aspects of the present disclosure relate to the creation of delta virtual machine (VM) images corresponding to changes in the state of a VM's virtual disk. A delta VM image includes metadata information corresponding to its virtual disk file as well as a virtual disk file of a parent VM image. The metadata information makes delta VM image uniquely identifiable such that they may be searched for and used for creating VMs.

18 Claims, 6 Drawing Sheets

INCREASING REUSABILITY OF AND REDUCING STORAGE RESOURCES REQUIRED FOR VIRTUAL MACHINE IMAGES

RELATED APPLICATIONS

Benefit is claimed under 35 U.S.C. 119(a)-(d) to Foreign Application Serial No. 201741025199 filed in India entitled "INCREASING REUSABILITY OF AND REDUCING STORAGE RESOURCES REQUIRED FOR VIRTUAL MACHINE IMAGES", on Jul. 15, 2017, by VMware, Inc, which is herein incorporated in its entirety by reference for all purposes.

BACKGROUND

Since the usage of virtual machines has gained in popularity, certain techniques have been developed for users to preserve the state of virtual machines enabling users to restore the virtual machines to their preserved states. For example, in some cases, a user may deploy a virtual machine ("VM"), configure the VM (e.g., install software applications, add/delete files, etc.), and then capture an image or snapshot (also referred to as a "VM image") of the state, disk data, and configuration of the VM at that specific point in time while the VM is running. The same user and/or a different user can later utilize the stored VM image, including the installed software, without having to reconfigure the VM from scratch. Accordingly, different VMs can be configured for use by users, VM images stored of the VMs, and the stored VM images used to quickly deploy VMs for use. However, one or more users may generate a large number of different VMs, such as different VMs with different versions of a software application installed, VMs with different sets of software applications installed, etc. For example, one or more users in a group (e.g., company) may generate a large number of VMs, and accordingly, a large number of VM images for the VMs need to be stored. Managing and storing such a large number of VM images may be difficult and require a significant amount of storage.

SUMMARY

Here are described one or more embodiments of a method for generating images corresponding to virtual computing instances. The method generally includes the steps of creating a virtual computing instance on a host machine from a base image, the base image representing the virtual computing instance including a virtual disk in a first state, the virtual computing instance on the host machine being associated with a parent virtual disk file corresponding to the virtual disk in the first state, creating a delta virtual disk file corresponding to differences between the first state of the virtual disk and a second state of the virtual disk, updating a configuration of the virtual computing instance by performing writes to the delta virtual disk file corresponding to the changes to the virtual disk from the first state of the virtual disk to the second state of the virtual disk, and generating a delta image corresponding to the updated configuration of the virtual computing instance, the delta image comprising the delta virtual disk file and an identifier of the base image.

Also described herein are embodiments of a non-transitory computer-readable storage medium storing instructions that, when executed by a computer system, cause the computer system to perform the method described above for generating images corresponding to virtual computing instances.

Also described herein are embodiments of a computer system programmed to carry out the method described above for generating images corresponding to virtual computing instances.

DETAILED DESCRIPTION

Embodiments presented herein relate to techniques for enabling the creation of delta VM images from previous VM images corresponding to VMs. For example, a user may generate a new VM from a VM image of a previous VM, such as by loading a VM image of a previous VM and installing a new application on the new VM. Typically, to store the new VM, a VM image of the entire new VM would need to be stored. However, in certain embodiments, techniques herein allow for a delta VM image to be stored that stores the differences between the previous VM and the new VM, instead of the VM image of the entire new VM, thereby reducing storage requirements.

Figure 1:
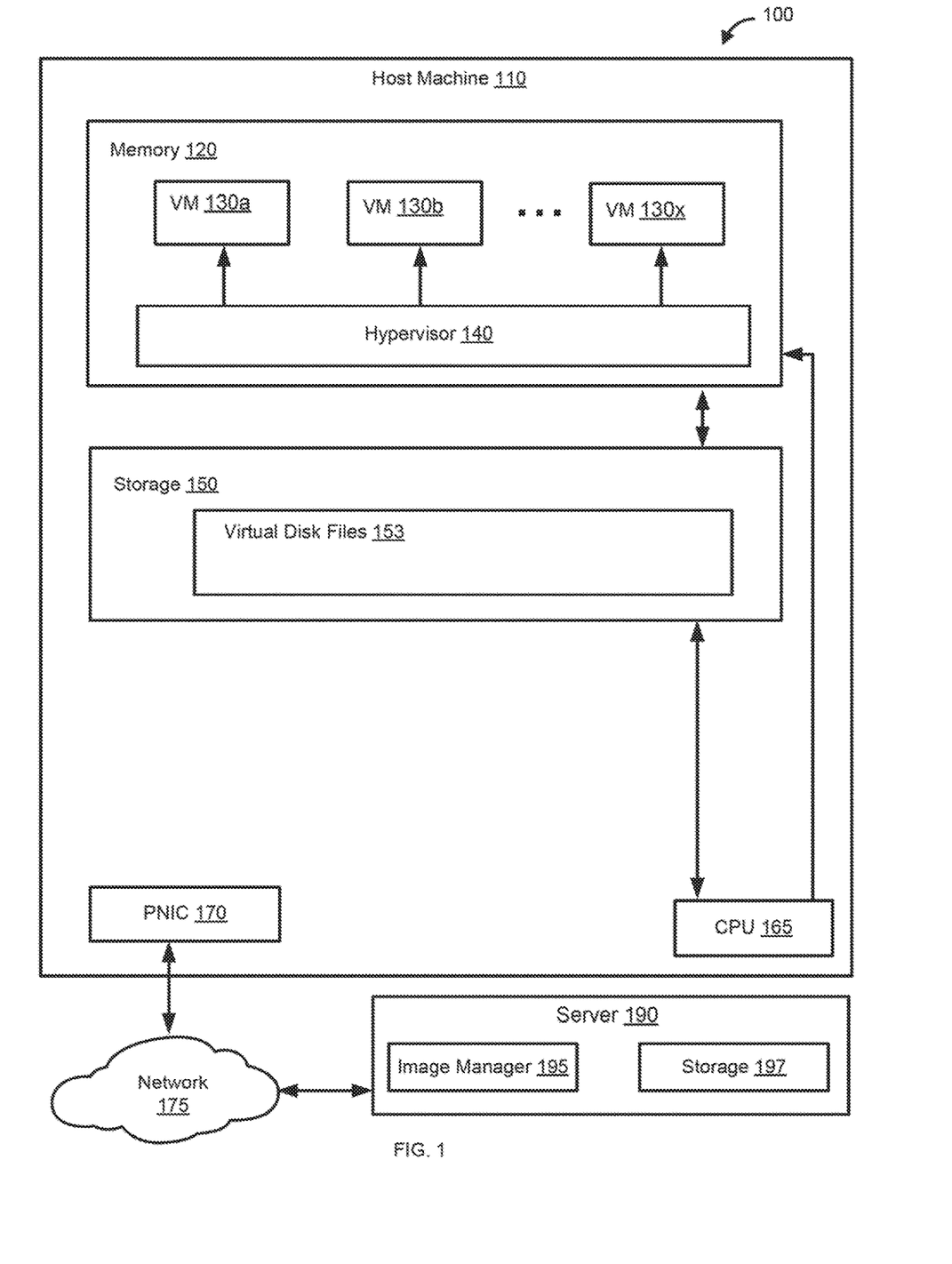
FIG. 1 illustrates components of an example system in which an embodiment may be implemented.

FIG. 1 illustrates components of a system 100 in which an embodiment may be implemented. As shown, system 100 is a virtualized environment that includes host machine 110, a physical network 175, and a server 190. In some embodiments, host machine 110 may be constructed on conventional hardware platforms that include one or more central processing units shown as CPU 165, memory 120, storage 150, and physical network interface controllers (PNICs) shown as PNIC 170. CPU 165 may execute instructions stored in memory 120 that perform one or more operations described herein. Memory 120 may include, for example, one or more random access memory (RAM) modules. Storage 150 may be a non-volatile storage. Storage 150 may be internal and/or external to host 110. In some embodiments, storage 150 may be implemented as software-defined storage such as VMware Virtual SAN that clusters together server-attached hard disks and/or solid state drives (HDDs and/or SSDs), to create a flash-optimized, highly resilient shared datastore designed for virtual environments.

Storage 150 may include one or more locally attached storage devices, for example, one or more hard disks, flash memory modules, solid state disks, and optical disks. In some embodiments, storage 150 may include a shared storage system having one or more storage arrays of any type such as a network-attached storage (NAS) or a block-based device over a storage area network (SAN). For example, storage 150 may be shared among multiple hosts. A disk interface (not shown), such as a host bus adapter (HBA), enables host 110 to communicate with a storage device, such as storage 150, to store "virtual disks" that are accessed by VMs 130, as described later.

Although a single host machine 110 is depicted, it should be understood that a virtualized environment may generally include any number of such devices or may not include certain such devices connected to network 175 or may include additional devices.

Network 175 can include various physical routers, switches, and like network appliances that facilitate communication between host machine 110 and server 190.

Host machine 110 may execute a virtualization layer shown as hypervisor 140 that is stored in memory 120. Hypervisor 140 may further implement VMs 130a, 130b, . . . 130n, where "n" is shown to indicate that host machine 110 may implement any number of VMs. Hypervisor 140 abstracts processor, memory, storage, and/or networking resources into multiple VMs (e.g., VMs 130a, 130b, . . . 130n) that run side-by-side on the same physical host machine 110. That is, hypervisor 140 partitions physical host machine 110 into multiple secure and portable VMs. Each VM represents a complete system—with processors, memory, networking, storage, and/or BIOS. In some embodiments, hypervisor 140 can be installed directly on host machine 110 and inserts a virtualization layer between the hardware and the operating system. Alternatively, hypervisor 140 may run on top of a conventional operating system in host machine 110. One example of hypervisor 140 that may be used in an embodiment described herein is a hypervisor provided as pan of the VMware vSphere® solution made commercially available from VMware, Inc. of Palo Alto, Calif.

VMs 130a, 130b, . . . 130n may each include a software-based virtual network adapter, referred to as virtual network interface card (VNIC), that is logically connected to PNIC 170 included in host machine 110 that provides network access for VMs 130. In some cases, VMs 130a, 130b, . . . 130n may implement one or more containers, such as Docker containers, and may be referred to as a workload or endpoint. Alternatively, in place of hypervisor, a bare-metal computer operating system may be implemented on host machine 110, and in place of VMs 130, a plurality of name-space containers may be implemented by the operating system. Though certain aspects are described herein with respect to VMs, such aspects may similarly be applicable to other virtual computing instances (e.g., containers, Docker containers, etc.).

Storage 150 may store virtual disk files 153 (e.g., as vmdk files) that are accessed by VMs 130 executing on host machine 110. In certain aspects, storage 150 stores the virtual disk files 153 as part of a hierarchical file system for storing files. A virtual disk file stores the contents of a VM's virtual disk drive (e.g., abstracted storage). For example, a virtual disk exposes the same abstraction as a real (physical) disk, that is, a linear list of sectors; however, hypervisor 140 may choose to implement virtual disks as virtual disk files 153 on the storage 150. For example, each VM 130 may have a corresponding virtual disk implemented as a corresponding virtual disk file 153 on storage 150.

As described above, each VM 130 represents a complete system including, among other things, a virtual disk that is stored as a set of virtual disk files in memory 120 of host machine 110. The number of virtual disk files that together make up the contents of the VM's virtual disk depends on the size of the virtual disk and a configured storage policy that defines the size of each virtual disk file. For example, if a virtual disk is 10 GB and the storage policy indicates that the virtual disk is to be split into 2 GB chunks, the resulting number of virtual disk files is five, each containing 2 GB of the virtual disk's information. Accordingly, although in the following description a single virtual disk file has been described for a VM 130, it should be understood that a virtual disk may correspond to any number of virtual disk files.

A VM 130 may be encapsulated within a data package for transmission, distribution, and loading into a virtual-execution environment. For example, data corresponding to a VM 130 may be stored as a VM image that can be distributed and deployed on a host machine (e.g., host machine 110). One public standard for virtual-machine encapsulation is referred to as the "open virtualization format" ("OVF"). The OVF standard specifies a format for digitally encoding a virtual machine within one or more data files, which may be referred to as a VM image. For example, a VM image may be an OVF package which includes an OVF descriptor, an OVF manifest, an OVF certificate, one or more disk-image files (e.g., virtual disk files 153), and one or more resource files. The VM image can be encoded and stored as a single file or as a set of files. The OVF descriptor may be an XML document that includes a hierarchical set of elements, each demarcated by a beginning tag and an ending tag. The outermost, or highest-level, element may be the envelope element, demarcated by tags. The next-level element may include a reference element that includes references to all files that are part of the OVF package, a disk section that contains meta information about all of the virtual disks included in the OVF package, a networks section that includes meta information about all of the logical networks included in the OVF package, and a collection of virtual-machine configurations which further includes hardware descriptions of each virtual machine. There may be many additional hierarchical levels and elements within a typical OVF descriptor. The OVF descriptor may thus be a self-describing, XML file that describes the contents of an OVF package. The OVF manifest may be a list of cryptographic-hash-function-generated digests of the entire OVF package and of the various components of the OVF package. The OVF certificate may be an authentication certificate that includes a digest of the manifest and that is cryptographically signed. Disk image files, such as virtual disk file 153, may be digital encodings of the contents of virtual disks and resource files may be digitally encoded content, such as operating-system images. A virtual machine or a collection of virtual machines encapsulated together within a virtual application can thus be digitally encoded as one or more flies within a VM image that can be transmitted, distributed, and loaded using well-known tools for transmitting, distributing, and loading files. A virtual appliance may be a software service that is delivered as a complete software stack installed within one or more virtual machines that is encoded within a VM image.

Accordingly, as discussed, many such VM images may be created and stored for deployment as VMs. For example, the VM images may be stored at a storage 150 or another storage (e.g., storage 197) accessible via network 175, and users may access the storage to load VM images and instantiate a VM based on the VM image on host machine 110 or another device. A large number of different VM images (e.g., corresponding to VMs with different configurations such as different applications installed) may take a significant amount of storage space to store each VM image on the storage.

Figure 2:
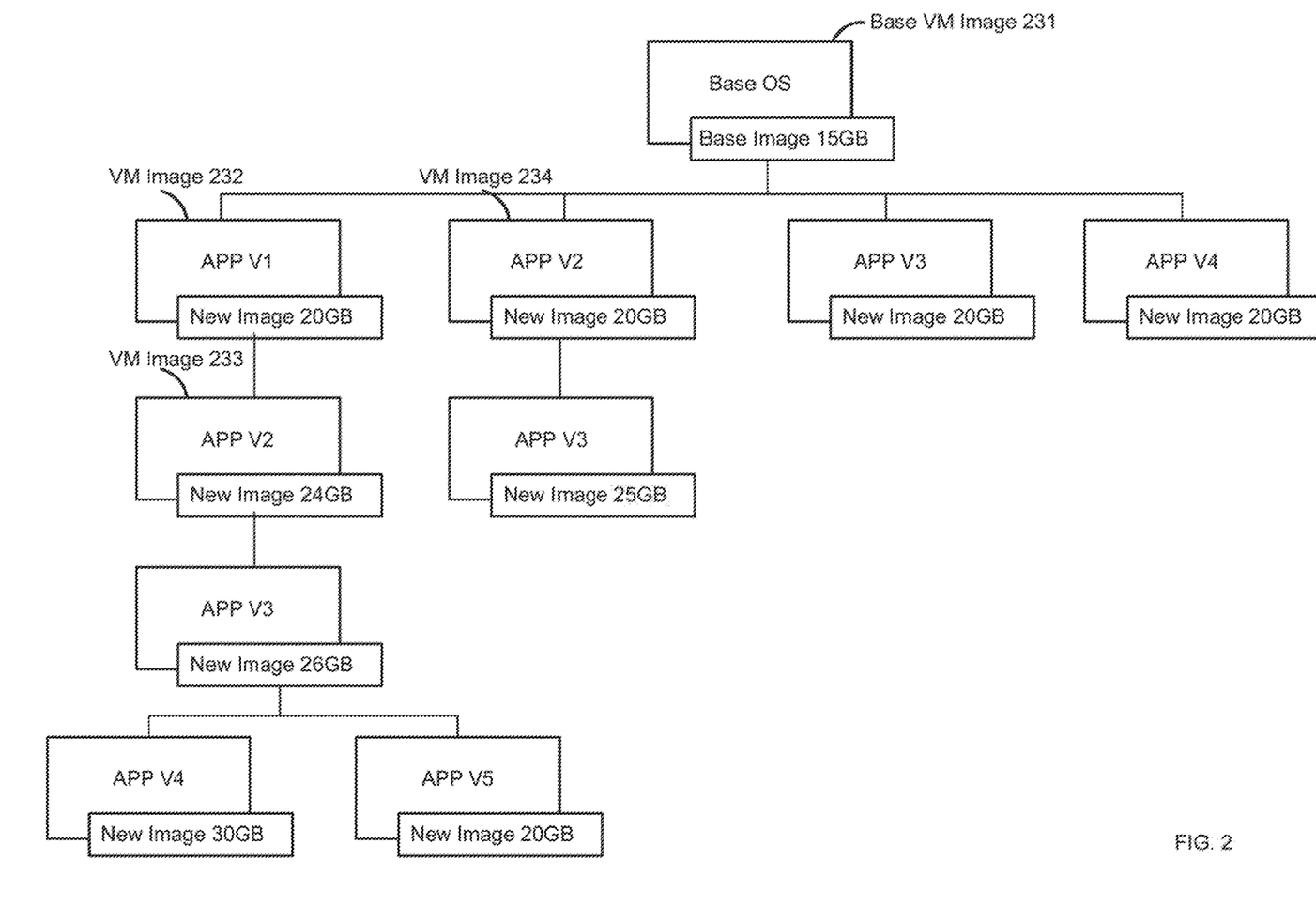
FIG. 2 illustrates an example of a conceptual hierarchy of VM images, in accordance with some embodiments.

In reality, however, the VMs represented by the multiple stored VM images may share much of the same information. In some cases, users may generate VMs from previous VMs. Accordingly, in some cases a user may want to make changes to a VM defined by a VM image and save the updated VM as a new VM image. For example, a user may install a new software application, update existing software applications, etc. The user may start with a "base" VM, which may only include a basic set of applications (e.g., an operating system, essential basic applications, etc.). The user may then create a base VM image of the base VM. The user may further create another VM that is an updated version or "child" of the "base" VM, which may be a "parent" VM of the child VM. For example, the administrator may add particular software applications (e.g., a web browser, spreadsheet application, document editor, etc.). The user may typically save the updated child VM as an entire new VM image that is a complete image of the VM, which may take a large amount of storage space. As shown in FIG. 2, storing complete images of a VM, after incremental changes have been made to the configuration of the VM, requires a significant amount of storage.

FIG. 2 illustrates an example of a conceptual hierarchy of VM images including a base VM image (e.g., base VM image 231 corresponding to, e.g., VM 130a of FIG. 1) as well as a number of subsequent VM images created using the base VM image after installing various versions of a software application (e.g., APP). For example, each version X of the APP may be referred to as App vX. As shown, base VM image 231 is 15 GB in size and may correspond to a VM (e.g., VM 130a) with only a base operating system (OS) installed. Further, VM image 232 may correspond to a VM with APP v1 installed on the base OS. As shown, VM image 232 has a size of 20 GB, which is larger than the size of base VM image 231 due to the addition of APP v1.

In one example, after installing APP v1 and creating VM image 232, a user may then update the APP to a new version, such as APP v2, and create a third VM image, VM image 233. VM image 233 may be 24 GB in size. As shown in FIG. 2, the user may continue to create additional VM images. As described above, a parent VM image (e.g., VM image 232) refers to a VM image that the administrator was running when the child image (e.g., VM image 233) was created. In another example, instead of continuing to update the APP and creating a VM image after each APP update (e.g., VM image 232 after APP v1, VM image 233 after APP v2), the user may deploy the base VM again by using base image 231, install the current version of the APP, and create a VM image. VM image 234 is an example of a VM image created after the user goes back to the base VM and installs APP v2 as opposed to installing APP v2 as an update of APP v1 on VM image 232 and then, creating VM image 233.

As shown in FIG. 2, in some cases, one or more users may create multiple VM images after installing a certain version of a software application and store each VM image as a separate VM image, each of which may be tens of GBs in size. In some cases, the number of these VM images may reach thousands and storing them may require terabytes of storage. Even more, the VM images may not be uniquely identifiable, which reduces their reusability and causes the creation of even more VM images by other users. For example, users may not be able to search through a list of VM images and identity a VM image that provides a certain software application. As a result, the user may use a base VM image to deploy the base VM, install the software application, and create yet another VM image with the software application, even though the same VM image may exist in the storage and be available for use by the user. Accordingly, certain embodiments described herein relate to reducing the size of VM images and uniquely identifying them to increase their reusability and reduce the amount of storage required for storing them, as further described below.

Figure 3:
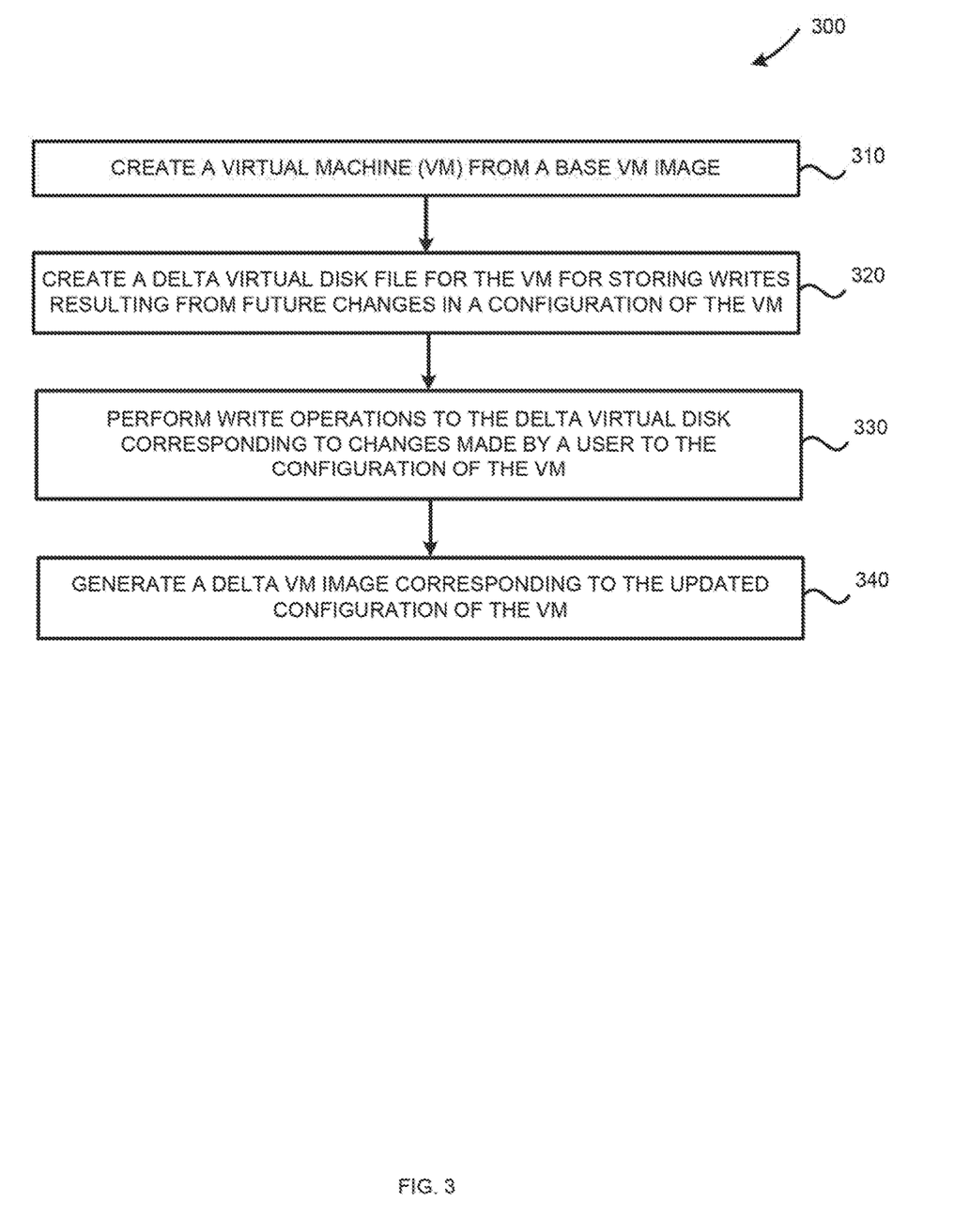
FIG. 3 illustrates example operations for creating a delta VM image, in accordance with some embodiments.

FIG. 3 illustrates example operations 300 for use by an image manager to create delta VM images, in accordance with some embodiments. In some embodiments, the image manager, shown as image manager 195, is stored by server 190. In some embodiments, the image manager may be stored in storage 150 of host machine 110. Image manager 195 may be used, in some embodiments, to generate delta VM images corresponding to child VM images of a parent VM image. For example, a user may want to generate a VM image from a previous VM image (e.g., parent VM image) as discussed. In certain aspects, a user can access image manager 195 using a user interface from a device (e.g., host machine 110, computing device, etc.) to generate such delta VM images. For example, a user may input a storage location of a base VM image to use as a parent VM image into the user interface.

Having received information from the user about the storage location of the base image, at 310, image manager 195 may create a VM on host machine 110 or the user's computing device from the base image. In some embodiments, the base image, as described above, is stored at the specified storage location as a base OVF package, which includes a base virtual disk file corresponding to a base VM from which the base VM image was created. Using this base OVF package, when creating the VM, image manager 195 creates a parent virtual disk file, which is a copy of the base virtual disk file in the base OVF package.

At 320, image manager 195 may create a delta virtual disk file for the VM for storing writes resulting from future changes in the configuration of the VM. In some embodiments, once a delta virtual disk file is created, the parent virtual disk file(s) switches to a read-only mode and all future writes with respect to the VM are issued to the delta virtual disk file. After the delta virtual disk file is created by image manager 195, the user may update the configuration of the VM by, for example, installing a software application, etc. In some embodiments, the user may update the configuration of the VM in response to receiving a prompt from image manager 195. For example, after the delta virtual disk file is created, image manager 195 may prompt the user through its user interlace to change or update the configuration of the VM.

At 330, image manager 195 performs write operations to the delta virtual disk file corresponding to the changes made by the user to the state of the VM's virtual disk. Accordingly, the delta virtual disk file corresponds to the differences between the state of the VM's virtual disk at the time it was created (e.g., first state) and the state of the virtual disk after the updates to the configuration of the VM (e.g., second state). In some embodiments, after updating the configuration of the VM, the user may provide an indication to image manager 195, through the user interface, that the user is finished with the update or change.

At 340, image manager 195 generates a delta VM image corresponding to the updated configuration of the VM. In some embodiments, the delta VM image (e.g., delta OVF package) comprises the delta virtual disk file as well as a metadata file (e.g., a dvf extension file) corresponding to tire delta virtual disk file and the base VM image. For example, the metadata includes an identifier of the delta VM image, where the identifier may be a short description about the delta VM image corresponding to the changes made by the user to the state of the VM (e.g., APP v1). The metadata may also include the path or storage location of the base VM image from which the VM was deployed. In addition, the metadata may include an ID (e.g., uuid) of the delta VM image as well as an ID of a parent delta VM image (i.e., if one exists, as described below). In some embodiments, the metadata may also include a pointer to the delta virtual disk file, which itself may contain a pointer to the parent virtual disk file.

In some embodiments, the metadata may further include additional information that the user may input when also inputting the storage location of the base VM image into the user interface of image manager 195, as described above. For example, the user may input information, which may be included in the metadata, about the type of OS that the base VM image includes. In addition, the user may input information, which may be also included in the metadata, about one or more software applications that the delta VM image includes.

In some embodiments, after the delta VM image above is created, the user may want to create another delta VM image with the base VM image as the parent. In such embodiments, the user may then return to the user interface of the image manager 195 and indicate a request for another delta VM image to be generated. In such embodiments, image manager 195 powers off the VM that the user had made changes to and allows the user to repeat steps 310-340 above by creating another VM from the base VM image again.

In some other embodiments, instead of creating another delta VM image from the base VM image as the parent, the user may want to continue making changes to the VM that the user is currently running and has already made changes to, as described in relation to step 320 above. The user then repeats steps 320-340 above resulting in a second delta VM image (i.e., child delta VM image), where the previous delta virtual disk file and the original parent virtual disk file are both switched to read-only mode and changes are written to a second delta virtual disk file. The second delta VM image, in some embodiments, comprises a second delta virtual disk file as well as a metadata file. The second delta virtual disk file corresponds to the differences between the state of the VM's virtual disk corresponding to the delta VM image (e.g., second state) and the state of the virtual disk after the further updates to the configuration of the VM (e.g., third state). The metadata file may, as described above, contain an identifier of the second delta VM image corresponding to the second delta virtual disk file, the delta VM image (as well as the base VM image). For example, the metadata includes an identifier of the second delta VM image as described above. The metadata may also include the path or storage location of the delta VM image. In addition, the metadata may include an ID (e.g., uuid) of the second delta VM image as well as an ID of the parent delta VM image. In some embodiments, the metadata may also include additional information that the user may input when also inputting the storage location of the base VM image into the user interface of image manager 195, as described above. In some embodiments, the metadata may also include a pointer to the second delta virtual disk file, which itself contains a pointer to the delta virtual disk file that also contains a pointer to the parent virtual disk file.

In some embodiments, all VM images (i.e., base and delta VM images etc.) created are stored in persistent storage 197 such that any user with access to server 190 is able to use the images to deploy VMs including operating systems and/or software applications that the user desires. In some embodiments, the VM images may be stored in storage 150 for use by users with access to host machine 110.

Accordingly, when a user decides to deploy a VM with a certain operating system and/or software application, the user is able to conduct a search (using the metadata in the VM images) for the certain OS and software application using the user interlace of image manager 195. In response to such a search by the user, image manager 195 may search through delta VM images in storage 197 or 150 to find one or more VM images that match the user's search.

Figure 4:
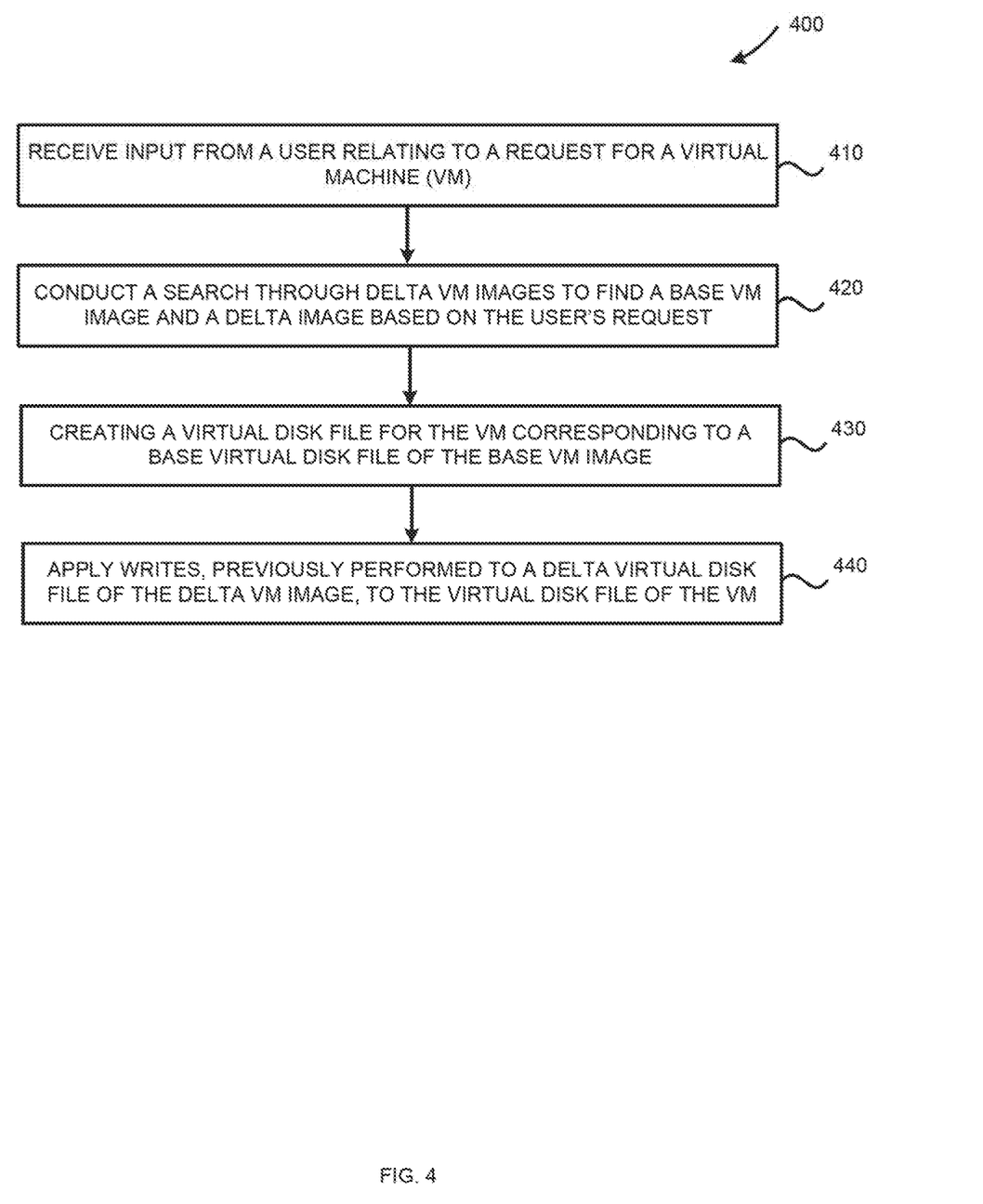
FIG. 4 illustrates example operations for creating a VM using a delta VM image and a base VM image, in accordance with some embodiments.

FIG. 4 illustrates example operations 400 for use by image manager 195 to create a VM using a base VM image as well as a delta VM image. Example operations 400 below are described by referring to components illustrated in FIG. 5.

Figure 5:
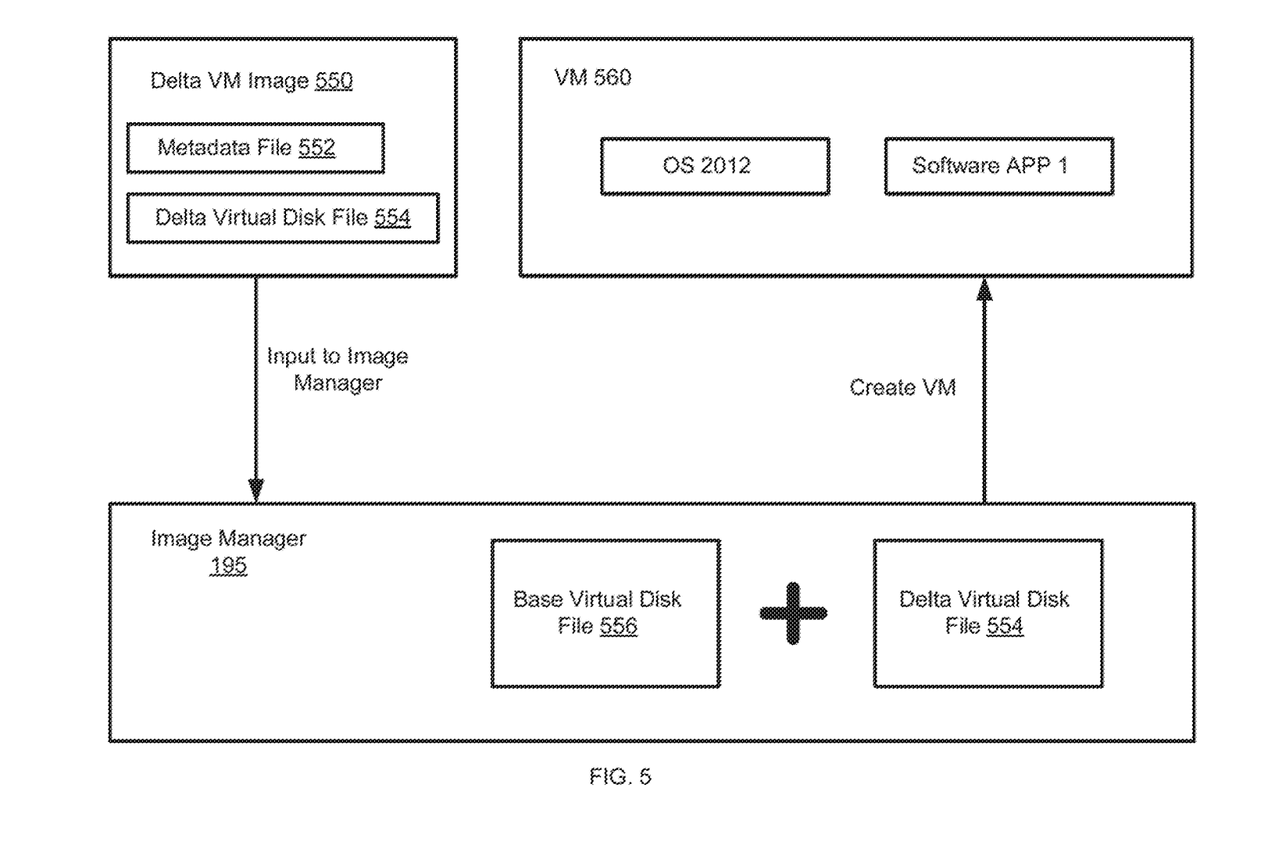
FIG. 5 illustrates an example software application for performing the operations of FIG. 4 by using a delta VM image to create a VM, in accordance with some embodiments.

At 410, image manager 195 receives input from a user relating to a request for a VM 560, shown in FIG. 5, with a certain characteristics (e.g., having OS 2012 and software APP 1 installed).

At 420, image manager 195 conducts a search through delta VM images resulting in delta VM image 550, as shown in FIG. 5, which matches the user's request. In some embodiments, the search is performed by comparing the information provided by the user's input with tags in the metadata files of the delta VM images. Having found delta image 550, image manager 195 then reads metadata file 552, which contains a pointer to delta virtual disk file 554, which itself contains a pointer to a base virtual disk file 556. Base virtual disk file 556 is the virtual disk file of the base image from which delta VM image 550 was created.

At 430, image manager 195 creates a virtual disk file for VM 560 that corresponds to or is a copy of base virtual disk file 556 of the base VM image.

At 440, image manager 195 applies writes, previously performed to delta virtual disk file 554 of delta image 550, to the virtual disk file of VM 560 so that the virtual disk file then corresponds to the combination of base virtual disk file 556 and delta virtual disk file 554, as shown in FIG. 5. Having created the virtual disk file, VM 560 is then able to be instantiated and used by the user.

In some embodiments, instead of finding a delta VM image whose parent VM image is a base VM image, as described in step 420, image manager 195 may find a delta VM image (i.e., child delta VM image) whose parent is another delta VM image (i.e., parent delta VM image) that was created from a base VM image. In such embodiments, similar to step 430, image manager 195 again creates a virtual disk file for the VM that corresponds to or is a copy of the base virtual disk file of the base VM image. Image manager 195 then applies writes, previously performed to the parent delta virtual disk file of the parent delta VM image, to the virtual disk file created for the VM. Next, image manager 195 applies writes, previously performed to the child delta virtual disk file, to the virtual file disk created for the VM. The resulting virtual disk file then corresponds to the base virtual disk file combined with the parent virtual disk filed as well as the child virtual disk file.

As described above, capturing delta VM images significantly reduces the amount of storage required in contrast to when VM images from the entire virtual disk of a VM are captured and stored. In addition, by creating a metadata file (e.g., metadata tile 552) for each delta VM image, image manager 195 makes each delta VM image uniquely identifiable thereby increasing usability. As a result, a single base VM image may be combined with any number of delta VM images to create and emulate VMs that provide a variety of software applications etc. An example of a reduction in the storage space required for storing VM images resulting from implementing the embodiments described above is shown in FIG. 5, which offers a comparison to FIG. 2, as previously described.

Figure 6:
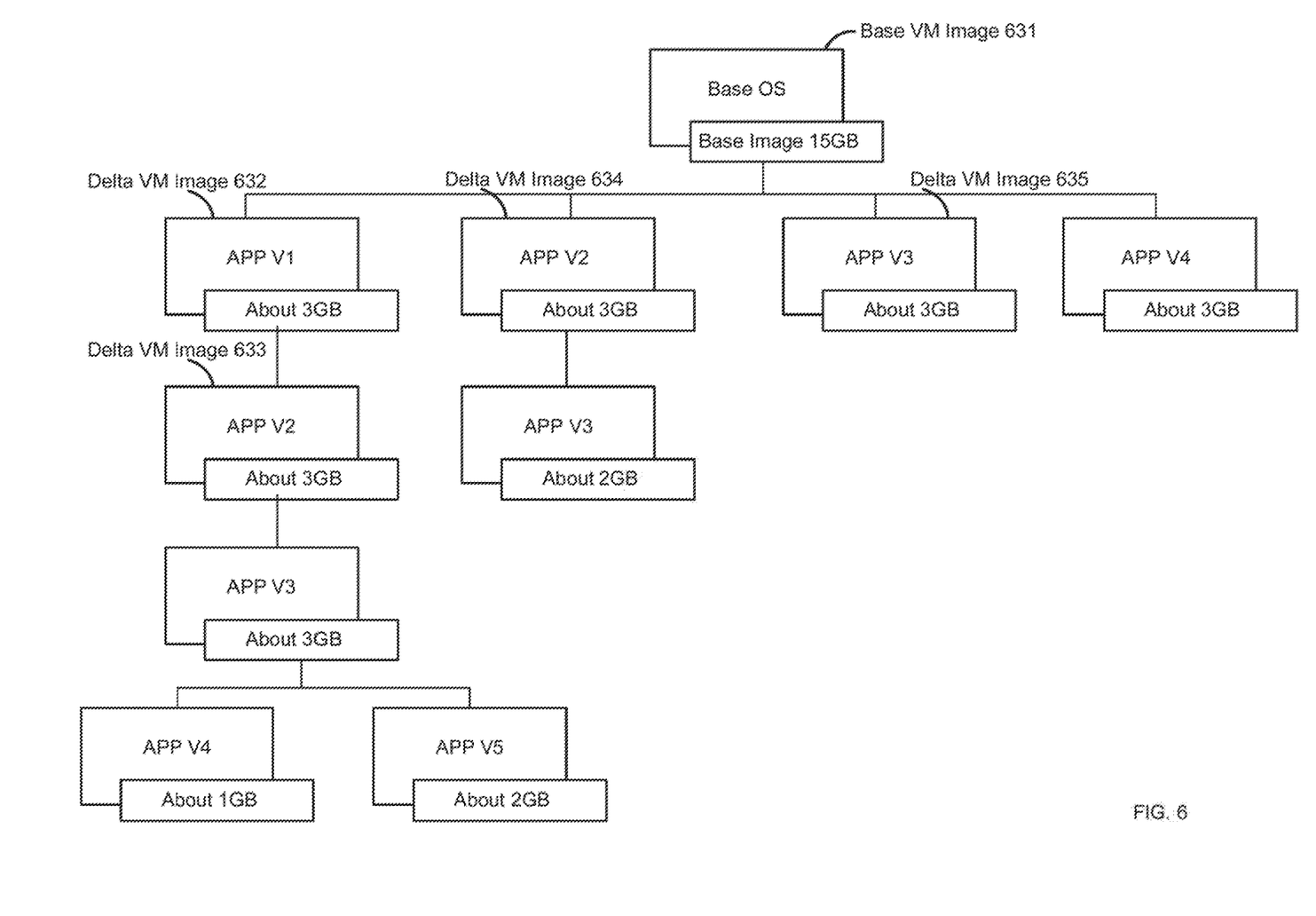
FIG. 6 illustrates an example of a conceptual hierarchy of VM images including a base VM image and a number of delta VM images, in accordance with some embodiments.

FIG. 6 illustrates an example of a conceptual hierarchy of VM images including a base VM image 631 as well as a number of delta VM images created using the base VM image after updating the configuration of a VM created from tire base VM image by the image manager, as described above. Base VM image 631 corresponds to base VM image 231 of FIG. 2, which is 15 GB in size and, as described above, may only contain code for running an operating system (e.g., Base OS). Similar to FIG. 2, each version X of the APP may be referenced to as App vX, Delta VM image 632 corresponds to an image created as a result of an update to the configuration of the VM (e.g., installing APP v1) instantiated using base VM image 631, as described above in relation to step 340 of FIG. 3. As shown delta VM image 632 is significantly smaller in size (e.g., 3 GB) than if an entire new VM image, such as VM image 232 of FIG. 2, had been captured from the complete image of the VM. Delta VM image 633 also corresponds to an image created as a result of additional updates (e.g., installing APP v2 after installing APP v1) to the state of the VM subsequent to the creation of delta VM image 632, as described in relation to FIG. 3. As shown, delta VM image 633 is also significantly smaller in size (e.g., 3 GB) than if an entirely new VM image, such as VM image 233 of FIG. 2, had been captured. As described above, in some case, instead of continuing to make further updates to the VM and creating additional delta VM images (e.g., delta VM image 633), the user may instantiate another VM from base VM image 631, update its configurations (e.g., install APP v2), and create delta VM image 634. Delta VM image 635 is another example of going back to instantiating a VM from base VM image 631, applying changes (e.g., installing APP v3), and creating a delta VM image. Creating delta VM images, in contrast to complete VM images, therefore, results in a significant reduction in the amount of storage required. Delta VM images may be also made uniquely identifiable, as described above, thereby increasing reusability, which in turn further reduces the amount of storage required to store VM images by preventing the creation of unnecessary and/or duplicated VM images.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, VMs are used as an example for the virtual computing instances and hypervisors as an example for the hardware abstraction layer. As described above, each VM includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interlaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for generating images corresponding to virtual computing instances, the method comprising:
    creating a virtual computing instance on a host machine from a base image, the base image representing the virtual computing instance including a virtual disk in a first state, the virtual computing instance on the host machine being associated with a parent virtual disk file corresponding to the virtual disk in the first state;
    creating a delta virtual disk file corresponding to differences between the first state of the virtual disk and a second state of the virtual disk;
    updating a configuration of the virtual computing instance by performing writes to the delta virtual disk file corresponding to the changes to the virtual disk from the first state of the virtual disk to the second state of the virtual disk;
    generating a delta image corresponding to the updated configuration of the virtual computing instance, the delta image comprising the delta virtual disk file and an identifier of the base image;
    creating a second delta virtual disk file corresponding to differences between the second state of the virtual disk and a third state of the virtual disk;
    updating further the configuration of the virtual computing instance by performing writes to the second delta virtual disk file corresponding to the changes to the virtual disk from the second state of the virtual disk to the third state of the virtual disk; and
    generating a second delta image corresponding to the further updated configuration of the virtual computing instance, the second delta image comprising the second delta virtual disk file and an identifier of the delta image.

2. The method of claim 1, further comprising creating a second virtual computing instance on one of the host machine or another host machine from the delta image and the base image identified by the delta image, the second virtual computing instance including a second virtual disk in the second state, the second virtual computing instance being associated with a second virtual disk file corresponding to the second virtual disk in the second state.

3. The method of claim 2, wherein creating the second virtual computing instance comprises:
    creating the second virtual disk file initially with data corresponding to the second virtual disk being in the first state; and
    applying the writes performed to the delta virtual disk file of the delta image to the second virtual disk file so the second virtual disk file corresponds to the second virtual disk being in the second state.

4. The method of claim 1, further comprising configuring the parent virtual disk file in a read only mode.

5. The method of claim 1, further comprising creating a second virtual computing instance on one of the host machine or another host machine from the second delta image, the delta image identified by the second delta image, and the base image identified by the delta image, the second virtual computing instance including a second virtual disk in the third state, the second virtual computing instance being associated with a second virtual disk file corresponding to the second virtual disk in the third state,
wherein creating the second virtual computing instance comprises:
    creating the second virtual disk file initially with data corresponding to the second virtual disk being in the first state;
    applying the writes performed to the delta virtual disk file of the delta image to the second virtual disk file so the second virtual disk file corresponds to the second virtual disk being in the second state; and
    applying the writes performed to the second delta virtual disk file of the second delta image to the second virtual disk file so the second virtual disk file corresponds to the second virtual disk being in the third state.

6. The method of claim 1, wherein the delta image further comprises at least one of an identifier of the updated configuration of the virtual computing instance, a location of the base image, an identifier of an operating system of the virtual computing instance, an identifier of software installed on the virtual computing instance, or an identifier of the delta image.

7. A non-transitory computer readable medium comprising instructions to be executed in a computer system, wherein the instructions when executed in the computer system perform a method for generating images corresponding to virtual computing instances, the method comprising:
    creating a virtual computing instance on a host machine from a base image, the base image representing the virtual computing instance including a virtual disk in a first state, the virtual computing instance on the host machine being associated with a parent virtual disk file corresponding to the virtual disk in the first state;
    creating a delta virtual disk file corresponding to differences between the first state of the virtual disk and a second state of the virtual disk;
    updating a configuration of the virtual computing instance by performing writes to the delta virtual disk file corresponding to the changes to the virtual disk from the first state of the virtual disk to the second state of the virtual disk;
    generating a delta image corresponding to the updated configuration of the virtual computing instance, the delta image comprising the delta virtual disk file and an identifier of the base image;

creating a second delta virtual disk file corresponding to differences between the second state of the virtual disk and a third state of the virtual disk;

updating further the configuration of the virtual computing instance by performing writes to the second delta virtual disk file corresponding to the changes to the virtual disk from the second state of the virtual disk to the third state of the virtual disk; and generating a second delta image corresponding to the further updated configuration of the virtual computing instance, the second delta image comprising the second delta virtual disk file and an identifier of the delta image.

8. The non-transitory computer readable medium of claim 7, wherein the method further comprises creating a second virtual computing instance on one of the host machine or another host machine from the delta image and the base image identified by the delta image, the second virtual computing instance including a second virtual disk in the second state, the second virtual computing instance being associated with a second virtual disk file corresponding to the second virtual disk in the second state.

9. The non-transitory computer readable medium of claim 8, wherein creating the second virtual computing instance comprises:

creating the second virtual disk file initially with data corresponding to the second virtual disk being in the first state; and applying the writes performed to the delta virtual disk file of the delta image to the second virtual disk file so the second virtual disk file corresponds to the second virtual disk being in the second state.

10. The non-transitory computer readable medium of claim 7, wherein the method further comprises configuring the parent virtual disk file in a read only mode.

11. The non-transitory computer readable medium of claim 7, wherein the method further comprises creating a second virtual computing instance on one of the host machine or another host machine from the second delta image, the delta image identified by the second delta image, and the base image identified by the delta image, the second virtual computing instance including a second virtual disk in the third state, the second virtual computing instance being associated with a second virtual disk file corresponding to the second virtual disk in the third state, wherein creating the second virtual computing instance comprises:

creating the second virtual disk file initially with data corresponding to the second virtual disk being in the first state;

applying the writes performed to the delta virtual disk file of the delta image to the second virtual disk file so the second virtual disk file corresponds to the second virtual disk being in the second state; and applying the writes performed to the second delta virtual disk file of the second delta image to the second virtual disk file so the second virtual disk file corresponds to the second virtual disk being in the third state.

12. The non-transitory computer readable medium of claim 7, wherein the delta image further comprises at least one of an identifier of the updated configuration of the virtual computing instance, a location of the base image, an identifier of an operating system of the virtual computing instance, an identifier of software installed on the virtual computing instance, or an identifier of the delta image.

13. A computer system, wherein system software for the computer system is programmed to execute a method for generating images corresponding to virtual computing instances, the method comprising:

creating a virtual computing instance on a host machine from a base image, the base image representing the virtual computing instance including a virtual disk in a first state, the virtual computing instance on the host machine being associated with a parent virtual disk file corresponding to the virtual disk in the first state;

creating a delta virtual disk file corresponding to differences between the first state of the virtual disk and a second state of the virtual disk;

updating a configuration of the virtual computing instance by performing writes to the delta virtual disk file corresponding to the changes to the virtual disk from the first state of the virtual disk to the second state of the virtual disk;

generating a delta image corresponding to the updated configuration of the virtual computing instance, the delta image comprising the delta virtual disk file and an identifier of the base image;

creating a second delta virtual disk file corresponding to differences between the second state of the virtual disk and a third state of the virtual disk;

updating further the configuration of the virtual computing instance by performing writes to the second delta virtual disk file corresponding to the changes to the virtual disk from the second state of the virtual disk to the third state of the virtual disk; and generating a second delta image corresponding to the further updated configuration of the virtual computing instance, the second delta image comprising the second delta virtual disk file and an identifier of the delta image.

14. The computer system of claim 13, wherein the method further comprises creating a second virtual computing instance on one of the host machine or another host machine from the delta image and the base image identified by the delta image, the second virtual computing instance including a second virtual disk in the second state, the second virtual computing instance being associated with a second virtual disk file corresponding to the second virtual disk in the second state.

15. The computer system of claim 14, wherein creating the second virtual computing instance comprises:

creating the second virtual disk file initially with data corresponding to the second virtual disk being in the first state; and applying the writes performed to the delta virtual disk file of the delta image to the second virtual disk file so the second virtual disk file corresponds to the second virtual disk being in the second state.

16. The computer system of claim 13, wherein the method further comprises configuring the parent virtual disk file in a read only mode.

17. The computer system of claim 13, wherein the method further comprises creating a second virtual computing instance on one of the host machine or another host machine from the second delta image, the delta image identified by the second delta image, and the base image identified by the delta image, the second virtual computing instance including a second virtual disk in the third state, the second virtual computing instance being associated with a second virtual disk file corresponding to the second virtual disk in the third state, wherein creating the second virtual computing instance comprises:

creating the second virtual disk file initially with data corresponding to the second virtual disk being in the first state;

applying the writes performed to the delta virtual disk file of the delta image to the second virtual disk file so the second virtual disk file corresponds to the second virtual disk being in the second state; and applying the writes performed to the second delta virtual disk file of the second delta image to the second virtual disk file so the second virtual disk file corresponds to the second virtual disk being in the third state.

18. The computer system of claim 13, wherein the delta image further comprises at least one of an identifier of the updated configuration of the virtual computing instance, a location of the base image, an identifier of an operating system of the virtual computing instance, an identifier of software installed on the virtual computing instance, or an identifier of the delta image.

* * * * *